May 7, 1957 C. J. CRANE 2,791,254
RESILIENT DISC TYPE SEED SHELLER
Filed March 10, 1954 2 Sheets-Sheet 1

INVENTOR.
Carl J. Crane
BY Watson, Cole, Grindle
& Watson
ATTORNEYS

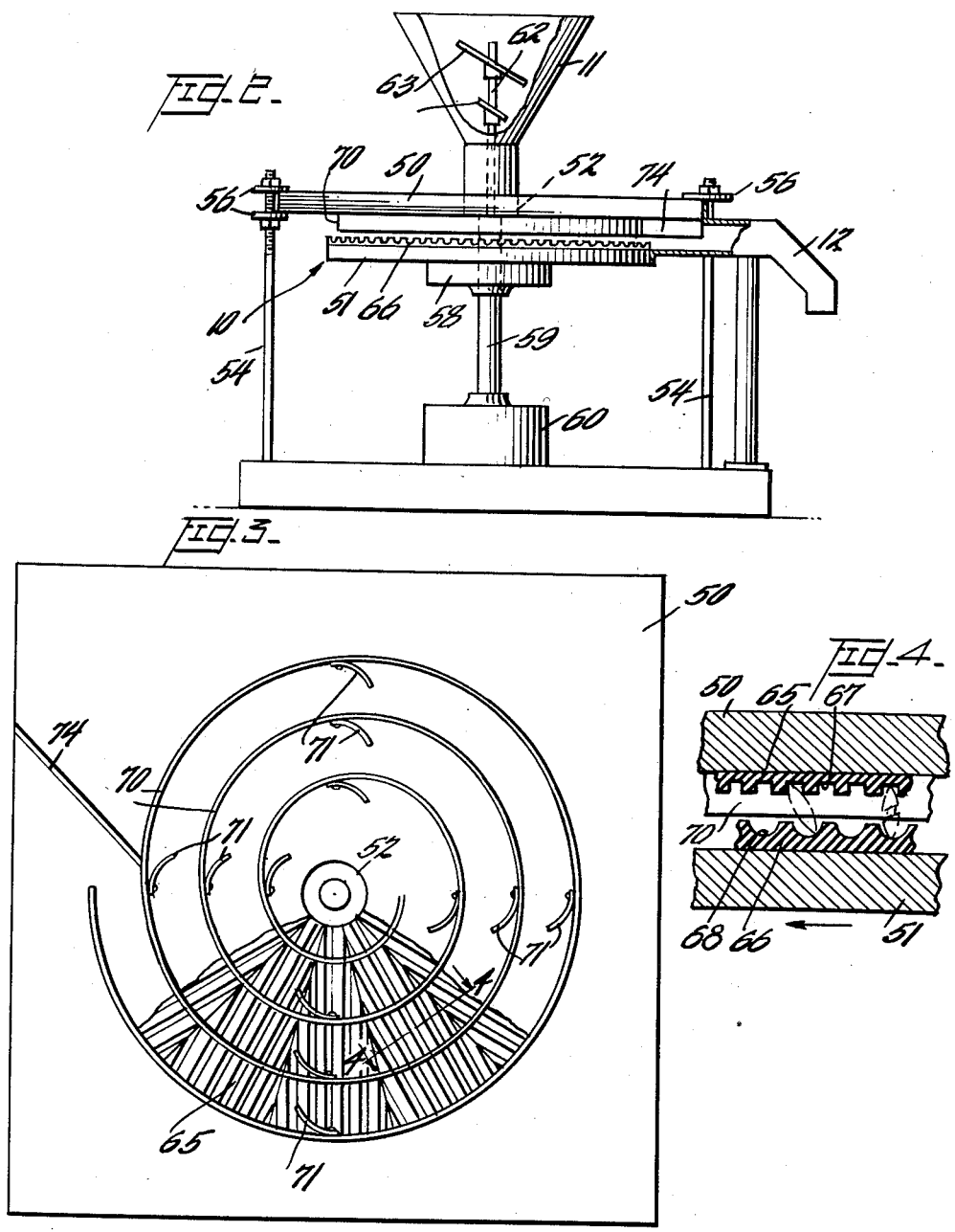

United States Patent Office 2,791,254
Patented May 7, 1957

2,791,254
RESILIENT DISC TYPE SEED SHELLER

Carl J. Crane, San Antonio, Tex.

Application March 10, 1954, Serial No. 415,334

12 Claims. (Cl. 146—298)

This invention relates to improvements in seed shelling apparatus and the like, and has for its object the removal of the shell or hull from the pit or kernel of seed and nuts.

The invention is especially useful in its application to the shelling of pumpkin and sunflower seed and for simplicity is hereinafter described with reference to such seed, although it will be appreciated that other analogous uses of the apparatus are contemplated. Cooked pumpkin seed pits, called "pepitas," are considered a delicacy, particularly in Mexico, and the instant apparatus is well suited to the shelling of such seed, an operation heretofore commonly and laboriously performed by hand.

More specifically, apparatus embodying the principles of the invention comprises a pair of relatively rotatable, juxtaposed plates having opposed facings provided with coacting radiating grooves. The seed is fed into the zone between the plates, and by virtue of the relative rotation of the plates and the coaction of certain other elements hereinafter described, tends to assume a position of alignment with the grooves and to approach, while resting in opposed grooves, a position normal to the plates. The spacing of the plates, which may be adjusted, and the depth of the opposed grooves is such that pressure is applied to the edges of the seed as the normal position is approached, whereby the seed shell is cracked or shattered or, if suitably wetted in advance, is opened at the edge seam to permit the pit to be squeezed out of the shell by further abrasion and pressure exerted by the coacting rubber facings. The shell fragments, the pits, and any incompletely treated seed are discharged from the shelling zone into a separator, any unshelled seed being returned for further operation by suitable conveyors and the like.

Preferably the opposed plates define substantially horizontal planes, the lower plate only is rotated, and the seed is introduced into the shelling zone through a central opening in the upper plate, being discharged peripherally. To facilitate the upending of the seed, I prefer to form the grooves in the facing of the lower plate with rounded bottoms and of greater depth than the opposed grooves in the upper plate, which may have flat sides to assist in rotating the seed in the lower rounded grooves.

Further objects and features of the invention will be apparent from the following description, taken with the accompanying drawings, in which Figure 1 is a schematic elevation of apparatus embodying the principles of the invention;

Figure 2 is an elevation of a preferred form of sheller, partly in section;

Figure 3 is a bottom plan view of the upper member of the seed expelling device, and Figure 4 is an enlarged partial section through the cooperating members of the seed expelling device showing both members, taken at the position indicated by line 4—4 of Figure 3.

Figure 1:
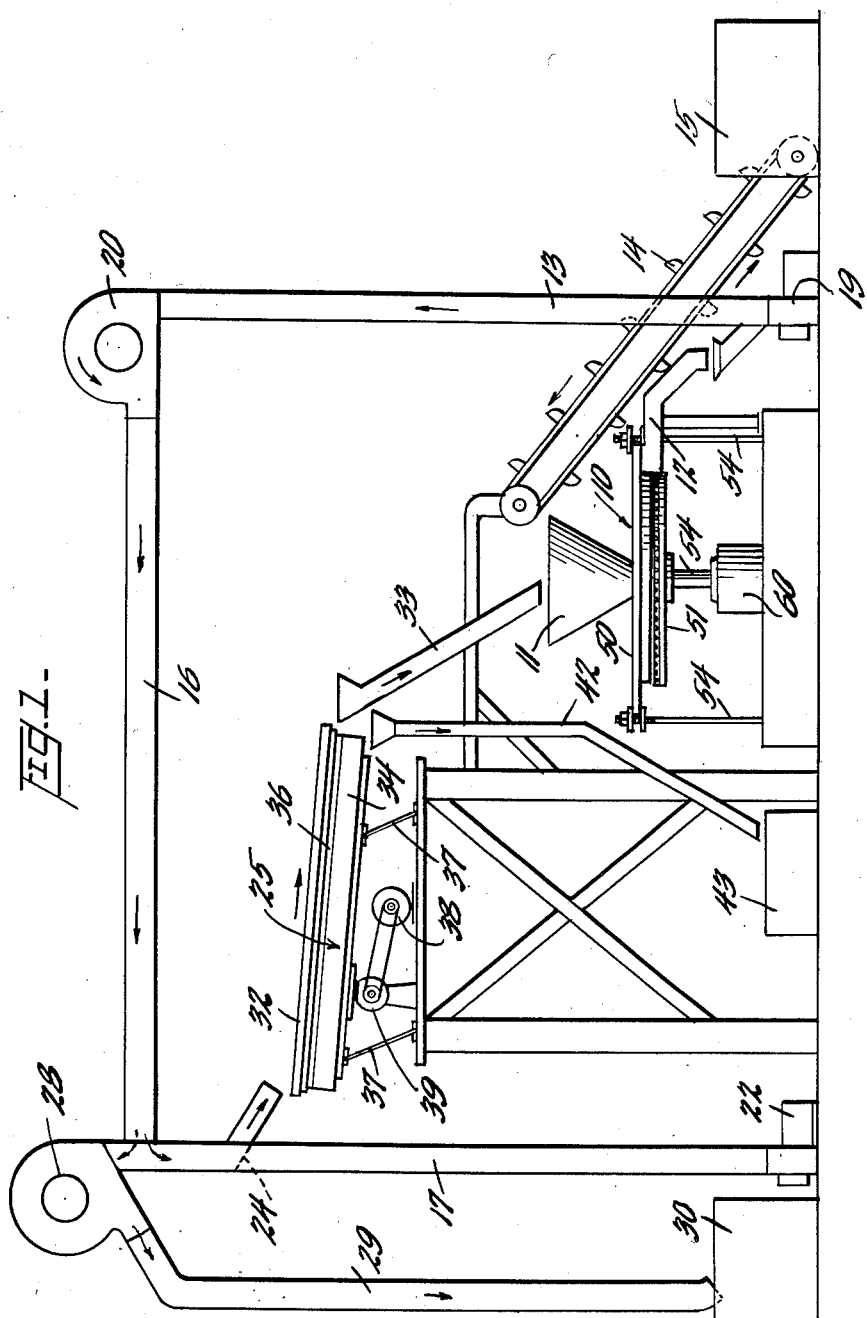

In order that the invention may be more readily understood, it is illustrated herein in its preferred embodiment, and specific language is used to describe the same. It will nevertheless be appreciated that the details may vary widely and that such further embodiments and such structural and functional alterations as would occur to those skilled in the art are contemplated as part of the invention and intended to be included herein.

Referring to Figure 1 of the drawing, the sheller in which the seed shells are peeled or otherwise removed from the pits, described more particularly hereinafter, is indicated generally at 10, being supplied centrally with prewetted seed from bin 15 by conveyor 14, discharging into hopper 11. Discharging material, including shells and fragments, pits, and any unopened seed, is delivered through chute 12 to duct 13 and thence through duct 16 to separating duct 17, movement of the material in ducts 13 and 16 being maintained by blowers 19 and 20. A blower 22 at the lower end of separating duct 17 carries the lighter material, including shells and fragments upwardly while the pits and unshelled seed fall onto an intercepting screen 24 and are discharged onto a vibrating screen separator 25. From the upper end of duct 17 the lighter material is discharged laterally by blower 28 and through duct 29 into container 30.

Separator 25 may be of any conventional type, having an upper tray 32, receiving the material and discharging unopened seed through chute 33 into supply hopper 11, and a lower tray 34 receiving pits passed through screen 36, the trays being supported on leaf springs 37 and driven through suitable vibrating mechanism 39 from motor 38. From tray 34 the pits may be discharged through a chute 42 into bin 43.

It will be appreciated that the apparatus thus far described includes, in addition to the sheller proper, which is the heart of the invention, devices for separating the ejected pits from the shells and for recirculating improperly treated seed to minimize loss. These devices may obviously be varied widely and the details modified substantially as may be required for the treatment of different kinds and condition of seed.

Turning now to Figures 2 to 4 inclusive, in which a preferred form of sheller is more particularly shown, it will be observed that sheller 10 comprises superposed plates 50 and 51, disposed substantially horizontally. The upper plate 50, which is stationary, is centrally apertured as indicated at 52 to admit seed material from hopper 11 to the shelling zone intermediate the plates and is supported peripherally on standards 54 for vertical adjustment by nuts 56, threaded thereon. Lower plate 51 is carried by flange 58 on motor shaft 59, motor 60 serving both to support and to rotate plate 51. Secured to plate 51 coaxially with motor shaft 59, and extending upwardly through opening 52 in upper plate 50 and into hopper 11, is a shaft 62 carrying wobble plates 63 which promote gradual downward feed of seed from the hopper into the shelling zone between plates 50 and 51.

The construction just described affords a convenient method of charging the seed material centrally, and of providing the requisite relative rotation between the coacting plates. It will be appreciated, however, that certain features and advantages of the invention are not dependent on this arrangement, and that in its broader aspect the invention contemplates rotation of the upper plate rather than the lower, or concurrent rotation of both plates, and either central or peripheral feed.

Plates 50 and 51 are preferably provided with facings of yieldable material, such as rubber, provided with outwardly directed, generally radial grooves for manipulating, striking and abrading the seed, the facings being bonded or otherwise secured to the opposed surfaces of the respective plates. Preferably the facings comprise, as shown in Figures 2 and 3, sectors of the selected material having on their confronting surfaces longitudinal grooves (and ribs) which, because the sectors are narrow, are radial for practical purposes. The grooves 67 in the facing 65 on the upper plate may have straight walls whereas the grooves 68 in the lower facing 66 are preferably deeper and rounded. The effect of these contours is illustrated in Figure 4, it being obvious from this figure that the upper facing tends to strike the seed and to rotate it into a position normal to the plates, the lower edge of the seed riding smoothly in the curved grooves of the lower facing. The depth of the opposed grooves and the spacing between plates 50 and 51 is such that the seed is subjected to edgewise pressure as it is so rotated, tending to open the edge seams of the shell as hereinbefore pointed out. The spacing, as well as the parallelism of the plates, may be accurately adjusted to give optimum results, especially with pre-wetted seed. The released pit, being somewhat rubbery and yielding when moist, and being of less diameter than the lateral dimension of the shell, is not injured by abrasion or pressure.

The use of yielding material such as rubber for the plate facings 65 and 66 is preferred, but not essential to effective operation. There may be used, for instance, a thermosetting plastic such as vinyl plastic which may be readily embossed, or a silicone base material, preferably selected to afford a slippery surface on which the seed may readily slide and rock into pit expelling position, as illustrated in Figure 4. Alternatively, plates 50 and 51 may be cast from light metals such as aluminum or magnesium, or light alloys, thus eliminating the need for a separate facing of different material. Under some circumstances it may be desirable to form the opposed surfaces of the plates from two different materials, for instance rubber and plastic. In selecting the facing material, the nature and condition of the seed is, of course, an important factor, and care must be exercised to employ material not subject to serious abrasion by the seed to be treated.

Both the shells and the pits, as well as unopened seed, tend to move outwardly by the action of centrifugal force, outward movement thereof being retarded and guided by a baffle 70 or spiral rib secured, for instance by welding, to the under face of the upper plate 50. To avoid the tendency of the seed to lie flat on the inner face of the rib, the latter is provided at spaced points in its length with abutments 71, tending to propel the seed inwardly and to rotate the seed into alignment with the grooves in the facings 65, 66 so that edgewise compression may be applied as heretofore described. The outer end of spiral rib 70 forms with a baffle plate 74, similarly secured to the under surface of upper plate 50, a discharge opening for seed material discharging into chute 12. The simplicity of this arrangement of guiding baffles, all supported on the stationary plate, will be apparent.

Depending on the direction of rotation of the plate 51 in relation to the hand of the spiral, the seed may be caused to travel either outwardly or inwardly, and while central feed and peripheral discharge is preferred, the reverse arrangement is contemplated as a modification of the invention.

Having thus described the invention, what is claimed as new and desired to be secured by Letters Patent is:

1. In apparatus for shelling seed, the combination with a pair of coacting plates supported in superposed spaced relation in generally horizontal planes, of means imparting relative rotation to said plates, the opposed surfaces of said plates being formed to provide generally radial grooves, the spacing between said plates and the depth of the grooves being such that pressure is applied to the edges of the shell of seed received in opposed grooves in the respective facings as the seed approaches a position normal to the plates, means delivering seed into the zone intermediate the plates adjacent the central portion thereof, means collecting shell fragments and seed pits adjacent the periphery of said plates, and a spiral rib associated with one of the plates for guiding the seed outwardly of the plates.

2. In apparatus for shelling seed, the combination with a pair of coacting plates supported in superposed spaced relation in generally horizontal planes, of means imparting relative rotation to said plates, the opposed surfaces of said plates being formed to provide generally radial grooves, the spacing between said plates and the depth of the grooves being such that pressure is applied to the edges of the shell of seed received in opposed grooves in the respective facings as the seed approaches a position normal to the plates.

3. In apparatus for shelling seed, the combination with a pair of coacting plates supported in superposed spaced relation in generally horizontal planes, of means imparting relative rotation to said plates, the opposed surfaces of said plates having facings of yielding material formed to provide generally radial grooves, the spacing between said plates and the depth of the grooves being such that pressure is applied to the edges of the shell of seed received in opposed grooves in the respective facings as the seed approaches a position normal to the plates, and a spiral rib associated with one of the plates for guiding the seed outwardly of the plates.

4. In apparatus for shelling seed, the combination with a pair of coacting plates supported in superposed spaced relation in generally horizontal planes, of means imparting relative rotation to said plates, the opposed surfaces of said plates having facings of yielding material formed to provide generally radial grooves, the spacing between said plates and the depth of the grooves being such that pressure is applied to the edges of the shell of seed received in opposed grooves in the respective facings as the seed approaches a position normal to the plates, the grooves in one of said facings having rounded bottoms and being of greater depth than the grooves in the opposed facing.

5. In apparatus for shelling seed, the combination with a pair of coacting plates supported in superposed spaced relation in generally horizontal planes, of means imparting relative rotation to said plates, the opposed surfaces of said plates having facings of yielding material formed to provide generally radial grooves, the spacing between said plates and the depth of the grooves being such that pressure is applied to the edges of the shell of seed received in opposed grooves in the respective facings as the seed approaches a position normal to the plates, the grooves in the facing of the lower plate having rounded bottoms and being of greater depth than the grooves in the facing of the upper plate, the walls of the grooves in the facing of the upper plate being substantially flat.

6. In apparatus for shelling seed, the combination with a pair of coacting plates disposed in contiguous spaced relation, of means imparting relative rotation to said plates, the opposed surfaces of said plates having facings of rubber formed to provide outwardly extending grooves, the spacing between said plates and the depth of the grooves being such that pressure is applied to the edges of the shell of a seed received in opposed grooves in the respective plates as the seed approaches a position normal to the plates, and means supplying seeds to the zone between said plates.

7. In apparatus for shelling seed, the combination with a pair of coacting plates disposed in contiguous spaced relation, of means imparting relative rotation to said plates, the opposed surfaces of said plates having facings of rubber formed to provide outwardly extending grooves, the spacing between said plates and the depth of the grooves being such that pressure is applied to the edges of the shell of a seed received in opposed grooves on the respective plates as the seed approaches a position normal to the plates, and means supplying seeds to the zone between said plates, and means supporting said plates for adjustment toward and away from each other.

8. In apparatus for shelling seed, the combination with a pair of coacting plates disposed in contiguous spaced relation, of means imparting relative rotation to said plates, the opposed surfaces of said plates having facings of rubber formed to provide outwardly extending grooves, the spacing between said plates and the depth of the grooves being such that pressure is applied to the edges of the shell of a seed received in opposed grooves on the respective plates as the seed approaches a position normal to the plates, and means supplying seeds to the zone between said plates, and guide means associated with one of said plates and extending into the space between said plates for propelling the seed into alignment with said grooves.

9. In apparatus for shelling seed, the combination with a pair of coacting plates disposed in contiguous spaced relation, of means imparting relative rotation to said plates, the opposed surfaces of said plates having facings of rubber formed to provide outwardly extending grooves, the spacing between said plates and the depth of the grooves being such that pressure is applied to the edges of the shell of a seed received in opposed grooves on the respective plates as the seed approaches a position normal to the plates, means delivering seed into the zone intermediate the plates adjacent the central portion thereof, and means collecting shell fragments and seed pits adjacent the periphery of said plates.

10. In apparatus for shelling seed, the combination with a pair of coacting plates supported in superposed spaced relation in generally horizontal planes, of means imparting relative rotation to said plates, the opposed surfaces of said plates having facings of yielding material formed to provide generally radial grooves, the spacing between said plates and the depth of the grooves being such that pressure is applied to the edges of the shell of a seed received in opposed grooves on the respective plates as the seed approaches a position normal to the plates, means delivering seed into the zone intermediate the plates adjacent the central portion thereof, means collecting shell fragments and seed pits adjacent the periphery of said plates, a spiral rib associated with one of the plates for guiding the seed outwardly, and inwardly directed abutments adjacent spaced points on the inner face of the rib to throw the seed away from the rib and into a generally radial position.

11. In apparatus for shelling seed, the combination with a pair of coacting plates supported in superposed spaced relation in generally horizontal planes, of means imparting rotation to the lower of said plates, the upper of said plates having a centrally disposed opening therein, the opposed surfaces formed to provide generally radial grooves, the spacing between said plates and the depth of the grooves being such that pressure is applied to the edges of the shell of a seed received in opposed grooves on the respective plates as the seed approaches a position normal to the plates, means delivering seed through the opening into the upper of said plates into the zone intermediate the plates, means collecting shell fragments and seed pits adjacent the periphery of said plates, a spiral rib associated with one of the plates for guiding the seed outwardly, said rib having abutments at spaced intervals in the length thereof to present to the seed a discontinuous surface.

12. In apparatus for shelling seed, the combination with a pair of coacting plates supported in superposed spaced relation in generally horizontal planes, of means imparting rotation to the lower of said plates, the upper of said plates having a centrally disposed opening therein, the opposed surfaces of said plates having facings formed to provide generally radial grooves, the spacing between said plates and the depth of the grooves being such that pressure is applied to the edges of the shell of a seed received in opposed grooves on the respective plates as the seed approaches a position normal to the plates, means delivering seed through the opening into the upper of said plates into the zone intermediate the plates, and means collecting shell fragments and seed pits adjacent the periphery of said plates.

References Cited in the file of this patent
UNITED STATES PATENTS

| | | |
|---|---|---|
| 125,171 | Chichester | Apr. 2, 1872 |
| 235,672 | Currier | Dec. 21, 1880 |
| 1,574,138 | Vaughan | Feb. 23, 1926 |
| 1,970,540 | Benham | Aug. 21, 1934 |
| 2,435,592 | Loewy | Feb. 10, 1948 |
| 2,662,570 | Hansen | Dec. 15, 1953 |